E. J. FRASER.
Amalgamators.
No. 158,368. Patented Jan. 5, 1875.
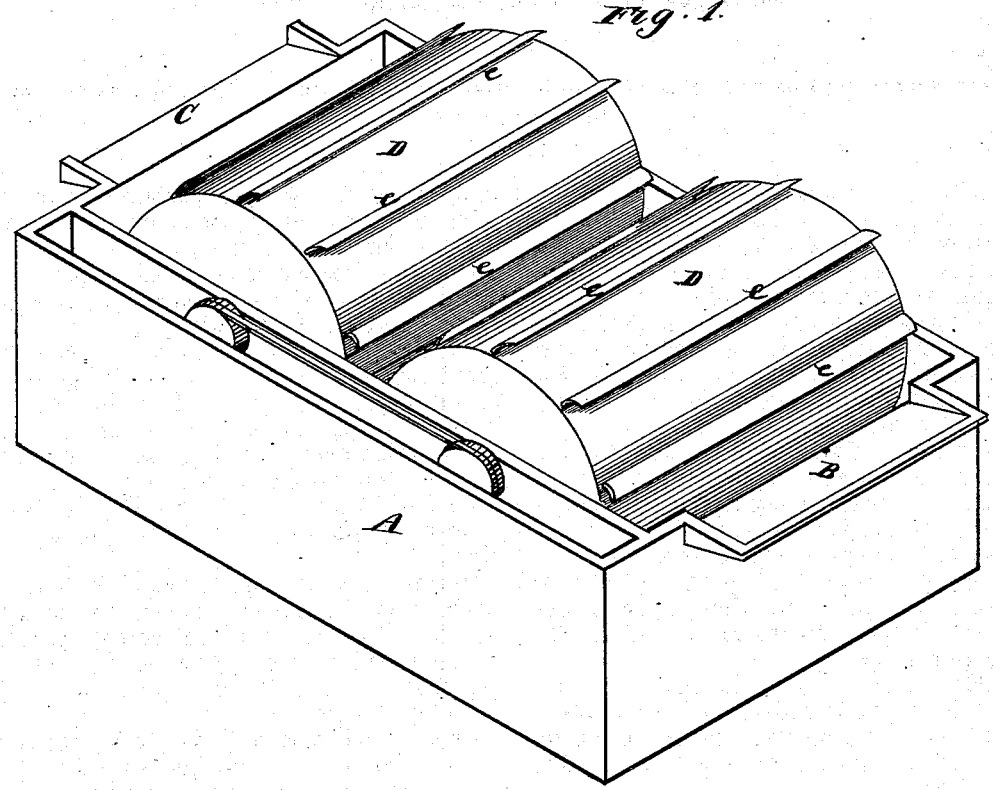
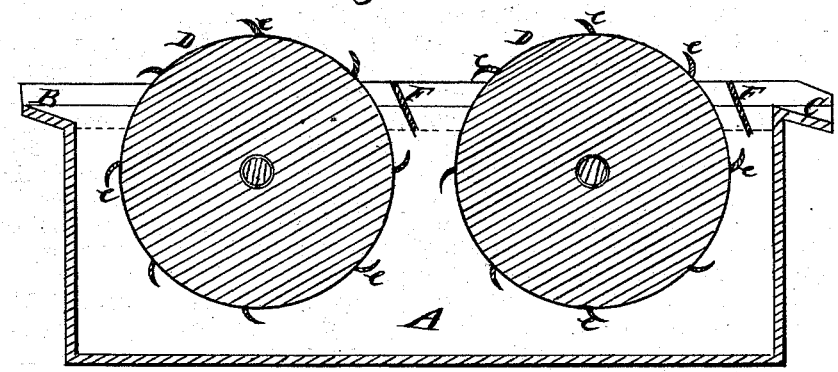
Witnesses
John L. Boone
C. M. Richardson
Inventor
Edwin J. Fraser
by Dewey & Co
Attys

UNITED STATES PATENT OFFICE.

EDWIN J. FRASER, OF SAN FRANCISCO, CALIFORNIA.

IMPROVEMENT IN AMALGAMATORS.

Specification forming part of Letters Patent No. 158,368, dated January 5, 1875; application filed September 14, 1874.

*To all whom it may concern:*

Be it known that I, EDWIN J. FRASER, of San Francisco city and county, State of California, have invented an Amalgamator; and I do hereby declare the following description and accompanying drawings are sufficient to enable any person skilled in the art or science to which it most nearly appertains to make and use my said invention without further invention or experiment.

My invention relates to a machine for subjecting dry pulverized ore to the action of quicksilver, in order to separate and amalgamate the metallic portion, while the lighter or non-metallic portion is carried away.

It is equally useful for separating the finely-divided amalgam after the pulverized ore has been submitted to the dry-barrel process of amalgamating.

In order to describe my invention so that others will be able to understand its construction and operation, reference is had to the accompanying drawing forming a part of this specification, in which—

Figure 1 is a perspective view of my machine. Fig. 2 is a longitudinal section.

A is a box or tank, having an inlet-spout, B, at one end, and an outlet-spout, C, at the opposite end. Inside of this tank I mount one or more cylinders, D, upon journals, which bear in the sides of the box or tank. When two or more cylinders are employed, they should be so placed that their outer rims will be a short distance from each other, so as to leave a narrow space between them. Each cylinder extends entirely across the inside of the tank, and is provided with a number of involute buckets, *e e e*. Between each two cylinders I secure a partition or plate, F, so that its lower edge will dip into the mercury and will be just cleared by the buckets *e e* of the first cylinder, while its upper edge extends above the surface of the quicksilver for the purpose hereafter shown.

Each cylinder D I clothe with copper, and each wing I also make of copper, so that each cylinder will preserve an amalgamated surface.

The tank A will be kept filled with quicksilver to a line above the axes of the cylinders, so that the greater portion of each cylinder will move in it, and thus preserve a fresh amalgamated surface.

The cylinders can be rotated by any convenient power, and are geared together, so that they turn simultaneously.

The dry pulverized ore to be amalgamated I feed into one end of the tank by means of the inlet-spout B. As it falls upon the surface of the quicksilver, the buckets *e* of the first rotating cylinder will catch it and draw it under the surface of the quicksilver, and around with it, so as to transfer it to its opposite side, and beyond its accompanying partition.

During their passage through the body of quicksilver, the particles of ore are brought into direct contact with the mercury and the amalgamated surface of the cylinder and buckets, thus insuring the amalgamation of the particles of metal.

As the ore is carried past the lowest point in the revolution of the buckets, the particles which have not become amalgamated will begin to rise on the opposite side of the cylinder, where they will be directed by the partition-plate F to the surface on the side opposite to the first cylinder, and within reach of the buckets of the adjoining cylinder, which again catch it, and repeat the process of submersion in the same manner as above described. This process will be repeated as often as there are cylinders in the tank. The worthless or non-metallic portion of the ore will finally be carried to the surface at the outlet-spout C, from whence it can be removed.

By this means the ore is thoroughly subjected to the action of the quicksilver, and any particles of metal which it contains are amalgamated.

This machine is simple and light, so that it can be easily transported, where it is impracticable to transport large amalgamating machinery, such as is usually employed for amalgamating in the wet way. It also offers the advantage of providing a means of amalgamating ores at points where water cannot be obtained.

Having thus described my invention, what

I claim, and desire to secure by Letters Patent, is—

In an amalgamator, having rotary drums, provided with buckets e e, the partitions F F, arranged with their upper edges above the surface of the mercury and their lower edges below its surface, as and for the purpose described.

In witness whereof I hereunto set my hand and seal.

EDWIN J. FRASER. [L. S.]

Witnesses:
GEO. H. STRONG,
C. M. RICHARDSON.